United States Patent
Blonde et al.

(10) Patent No.: US 9,846,302 B2
(45) Date of Patent: Dec. 19, 2017

(54) OPTICAL SEE-THROUGH GLASS TYPE DISPLAY DEVICE AND CORRESPONDING OPTICAL ELEMENT

(71) Applicant: THOMSON LICENSING, Issy de Moulineaux (FR)

(72) Inventors: Laurent Blonde, Thorigne-Fouillard (FR); Valter Drazic, Betton (FR)

(73) Assignee: Thomson Licensing (FR)

( * ) Notice: Subject to any disclaimer, the term of this patent is extended or adjusted under 35 U.S.C. 154(b) by 240 days.

(21) Appl. No.: 14/574,702

(22) Filed: Dec. 18, 2014

(65) Prior Publication Data

US 2015/0177516 A1 Jun. 25, 2015

(30) Foreign Application Priority Data

Dec. 18, 2013 (EP) .................................... 13306758

(51) Int. Cl.
*G02B 26/02* (2006.01)
*G02B 27/00* (2006.01)
(Continued)

(52) U.S. Cl.
CPC ....... *G02B 27/0101* (2013.01); *G02B 27/017* (2013.01); *G02F 1/315* (2013.01);
(Continued)

(58) Field of Classification Search
CPC ........ G02B 27/0172; G02B 2027/0178; G02B 27/0176; G02B 27/0101;
(Continued)

(56) References Cited

U.S. PATENT DOCUMENTS 6,236,511 B1 * 5/2001 Brown .................... G02B 3/08
359/634
6,288,846 B1 9/2001 Stoner
(Continued)

FOREIGN PATENT DOCUMENTS

| DE | 19700112 | 7/1998 |
| JP | 2011118168 | 6/2011 |
| JP | 201242521 | 3/2012 |

OTHER PUBLICATIONS

Whitesides etal: "Fluidic Optics", Department of Chemistry and Chemical Biology, Harvard University, Optofluidics, Proc. of SPIE vol. 6329, 63290A, (2006) Sep. 14, 2006; pp. 1-13.
(Continued)

*Primary Examiner* — Evelyn A Lester
(74) *Attorney, Agent, or Firm* — Jack Schwartz & Associates, PLLC

(57) ABSTRACT

An optical see-through glass type display device comprises: an image projector projecting a virtual image; a first optical element configured to guide light of the virtual image; and a second optical element having a first reflection surface for reflecting back light coming through the front surface of the second optical element and a second reflection surface for retro-reflecting light coming through the rear surface of the second optical element. The second optical element is switchable between a first state in which the reflection on the first and second reflection surfaces is enabled and a second state in which the reflection on the first and second reflection surfaces is disabled.

9 Claims, 6 Drawing Sheets

(51) Int. Cl.
G03B 21/00 (2006.01)
G02B 27/01 (2006.01)
G02F 1/315 (2006.01)
G02B 17/00 (2006.01)
G02B 5/30 (2006.01)
G02B 27/14 (2006.01)
G09G 3/36 (2006.01)
G03B 21/28 (2006.01)
G06T 19/20 (2011.01)
G02B 5/18 (2006.01)
G02B 6/00 (2006.01)
F21V 8/00 (2006.01)
G02B 13/16 (2006.01)
G02B 5/04 (2006.01)
G02B 19/00 (2006.01)
G02B 26/00 (2006.01)
G02B 3/08 (2006.01)
G02B 27/02 (2006.01)
G02B 27/09 (2006.01)

(52) U.S. Cl.
CPC ............... G02B 3/08 (2013.01); G02B 5/04 (2013.01); G02B 5/1842 (2013.01); G02B 5/3016 (2013.01); G02B 5/3083 (2013.01); G02B 6/00 (2013.01); G02B 6/0055 (2013.01); G02B 13/16 (2013.01); G02B 17/004 (2013.01); G02B 17/006 (2013.01); G02B 19/0038 (2013.01); G02B 26/005 (2013.01); G02B 27/0075 (2013.01); G02B 27/01 (2013.01); G02B 27/0103 (2013.01); G02B 27/0172 (2013.01); G02B 27/0176 (2013.01); G02B 27/022 (2013.01); G02B 27/0905 (2013.01); G02B 27/14 (2013.01); G02B 2027/0118 (2013.01); G02B 2027/0123 (2013.01); G02B 2027/0127 (2013.01); G02B 2027/0154 (2013.01); G02B 2027/0163 (2013.01); G02B 2027/0178 (2013.01); G03B 21/28 (2013.01); G06T 19/20 (2013.01); G09G 3/36 (2013.01)

(58) Field of Classification Search
CPC .......... G02B 2027/0118; G02B 27/017; G02B 2027/0123; G02B 27/014; G02B 27/01; G02B 2027/0127; G02B 2027/0154; G02B 3/08; G02B 5/3083; G02B 5/04; G02B 6/00; G02B 27/022; G02B 2027/0163; G02B 27/14; G02B 5/1842; G02B 6/0055; G02B 13/16; G02B 17/004; G02B 17/006; G02B 19/0038; G02B 26/005; G02B 27/0075; G02B 27/0103; G02B 27/0905; G02B 5/3016; G03B 21/28; G06T 19/20; G09G 3/36
USPC ....... 359/228, 443–460, 592, 597, 598, 630, 359/742; 351/159, 172; 353/11, 12, 28, 353/119
See application file for complete search history.

(56) References Cited

U.S. PATENT DOCUMENTS

| 8,384,999 | B1 | 2/2013 | Crosby et al. |
| 2008/0198459 | A1 | 8/2008 | Fergason |
| 2012/0050140 | A1 | 3/2012 | Border et al. |
| 2012/0068913 | A1 | 3/2012 | Bar-Zeev et al. |
| 2012/0069046 | A1 | 3/2012 | Rapoport et al. |
| 2012/0154277 | A1 | 6/2012 | Bar-Zeev et al. |
| 2012/0293548 | A1 | 11/2012 | Perez et al. |
| 2013/0234935 | A1 | 9/2013 | Griffith |

OTHER PUBLICATIONS

Zhang etal: "Effects of a retroreflective screen on depth perception in a head-mounted projection display"; 2010 9th IEEE International Symposium on Mixed and Augmented Reality (ISMAR)Science & Technology Papers; Oct. 13-16, 2010; pp. 137-145.

Zhang etal: "Imaging quality of a retroreflective screen in head-mounted projection displays"; Journal of the Optical Society of America A (Optics, Image Science and Vision); vol. 26, No. 5; May 2009; pp. 1240-1249.

* cited by examiner

OPTICAL SEE-THROUGH GLASS TYPE DISPLAY DEVICE AND CORRESPONDING OPTICAL ELEMENT

This application claims the benefit, under 35 U.S.C. §119 of European Patent Application No. 13306758.7, filed Dec. 18, 2013.

TECHNICAL FIELD

The present invention generally relates to an optical see-through glass type display device.

BACKGROUND ART

An optical see-through glass type display device provides a viewer with a virtual image projected onto the retina thanks to an optical see-through glass. The virtual image is superimposed onto an ambient scene image seen through the glass. The virtual image may be projected by a projector and guided into an eye of the viewer via an optical element on the glass.

When a viewer wears an optical see-through glass type display device, the viewer can observe simultaneously the ambient scene image with some attenuation caused by components of the device and the virtual image projected and guided into the viewer's eye via the projector and the optical element. The relative light power between the ambient scene image and the virtual image on the glass needs to be managed to ensure an adequate contrast of the two images. While the virtual image can be dimmed by adjusting the projector light flux, there is a need of attenuation of the ambient scene image, or even light blocking by some configurations needs to be applied on the ambient scene image to enhance contrast of the virtual image.

US2012068913A1 discloses a see-through head mounted display which includes a lens having an LCD panel as an opacity filter. The LCD panel is used to selectively block portions of a real-world scene so that an augmented reality image to be combined with the real-world scene on the lens appears more distinctly. Even in its transparent state the LCD panel as the opacity filter causes loss of light passing through the LCD panel due to light polarization by the LCD panel, thus any solution to adequately improve the transmission level of the opacity filter is needed.

SUMMARY OF THE INVENTION

According to an aspect of the present invention, an optical see-through glass type display device comprises an image projector projecting a virtual image; a first optical element configured to guide light of the virtual image; and a second optical element to be positioned between the first optical element and an ambient scene, having a first reflection surface for reflecting back light coming through the front surface of the second optical element and a second reflection surface for retro-reflecting light coming through the rear surface of the second optical element. The second optical element is switchable between a first state in which the reflection on the first and second reflection surfaces is enabled and a second state in which the reflection on the first and second reflection surfaces is disabled.

According to another aspect of the present invention, an optical element comprises a first reflection surface for reflecting back light coming through the front surface of the optical element and a second reflection surface for retro-reflecting light coming through the rear surface of the optical element. The optical element is switchable between a first state in which the reflection on the first and second reflection surfaces is enabled and a second state in which the reflection on the first and second reflection surfaces is disabled.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

These and other aspects, features and advantages of the present invention will become apparent from the following description in connection with the accompanying drawings in which.

DETAILED DESCRIPTION

In the following description, various aspects of an embodiment of the present invention will be described. For the purpose of explanation, specific configurations and details are set forth in order to provide a thorough understanding. However, it will also be apparent to one skilled in the art that the present invention may be implemented without the specific details present herein.

Figure 1:
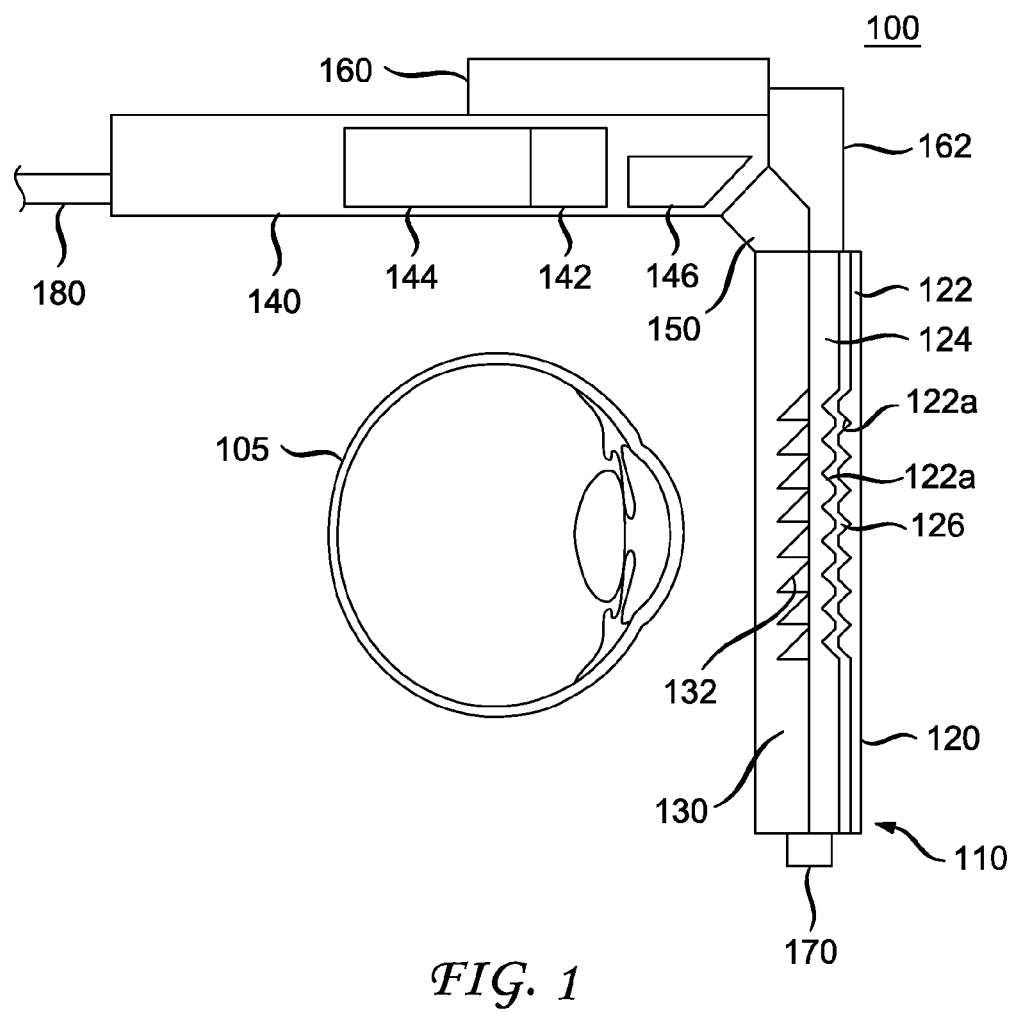
FIG. 1 illustrates a see-through glass type display device according to an embodiment of the present invention.

FIG. 1 illustrates a see-through glass type display device according to an embodiment of the present invention.

As shown in FIG. 1, the device 100 may include a glass plate unit 110 having a front side glass plate 120 and rear side glass plate 130, an image projector 140, an optical light guide element 150, a liquid supplier/remover 160. The device 100 may be an eye glasses type device, thus the device 100 also comprises a bridge 170 connecting two glass plate units each other and temple arms 180 that will extend respectively over the ears of a viewer to help hold the device 100 in place. In FIG. 1, only the half components of the device 100 for the left eye 105 of a viewer are illustrated for the simplicity of the illustration.

The front side glass plate 120 includes a first glass plate 122 to be located at ambient scene side and a second glass plate 124 to be located at a viewer's eye side. The first glass plate 122 has a reflective surface 122a on its rear side surface and the second glass plate 124 has a reflective surface 124a on its front side surface. The reflective surface 122a of the first glass plate 122 is configured so as to reflect back light coming from the front side of the glass plate 122. On the other hand, the reflective surface 124a of the second glass plate 124 is configured so that light coming from the rear side of the glass plate 124 can be retro-reflected back in the same direction of the light. The reflective surfaces 122a and 124a may be formed as a matrix of optical elements which can cause a total internal reflection (TIR). For example, a corner cube prism or any other type of retro-reflector prism may be employed as the optical element to provide the total internal reflection (TIR) towards the scene (122a) or towards the viewer's eye (124a).

The front side glass plate 120 further has a gap 126 formed between the rear surface of the first glass plate 122 and the front surface of the second glass plate 124. A liquid supplier/remover 160 is connected to the gap 126 via a conduit 162. The gap 126 can be filled with liquid supplied by the liquid supplier/remover 160 and the liquid in the gap 126 can be removed by the liquid supplier/remover 160 also. The liquid supplier/remover 160 may comprise a reservoir to contain the liquid, a pump for pumping the liquid into and out of the gap 126 and a controller to control the pump. Optionally, the plate 122 may be configured to move back and forth with regard to the plate 124 to help removing liquid from the gap 126 between the plates 122 and 124.

The rear side glass plate 130 has an array of semi-reflective mirrors 132 formed on the front surface of the rear side glass plate 130. The semi-reflective mirrors 132 may have wavelength selectivity for light reflection/transmission spectrum. In the disclosed example, semi-reflective mirrors 132 are configured to reflect light having wavebands matching RGB (Red, Green and Blue) light sources of the projector 140 and to transmit an ambient scene light which may include all wavelengths excluding the reflected ones. Each semi-reflective mirror 132 for each color (Red, Green and Blue) may be repeatedly arranged by rotation. The semi-reflective mirrors 132 will direct a light beam, projected from the image projector 140 and guided into the rear side glass plate 130 via the optical light guide element 150, so as to project from the rear side of the glass plate 130 toward the eye of the viewer of the device 100. Also, the semi-reflective mirrors 132 are transmissive for light coming from ambient scene to travel through the semi-reflective mirrors 132 toward the eye of the viewer.

The image projector 140 is configured to project a virtual image. For an example, the image projector 140 may comprise a display 142 for projecting the virtual image, a controller 144 for controlling the display 142 and an optical element 146 for guiding light from the display 142 to the optical light guide element 150. The image projector 140 may also comprise a receiver and a memory to receive and store images or videos to be projected as the virtual image, which images or videos are received from a device (not shown) storing the images or videos via a wired or wireless connection. An exemplary implementation of the display 142 can be made by an LCD (Liquid crystal display) and an LED (Light Emitting Diode) RGB light source module. It should be noted that any other technologies can be employed for implementing the display 142.

Light beam of the virtual image projected by the image projector 140 is guided via the optical element 146 and the optical light guide element 150 and then comes into the rear side glass plate 130. The light beam is laterally propagated within the rear side glass plate 130 by total internal reflection (TIR) between both surfaces of the plate 130. Then, the light beam is directed toward the eye 105 of the viewer of the device 100 by the semi-reflective mirrors 132. As a result of these processes, the virtual image is presented to the viewer.

It should be noted that dimensions, angles, and refraction indices of the components 146, 150, 130 as well as dimensions, angles and positions of each semi-reflective mirrors 132 on the rear side glass plate 130 are defined so that the virtual image from the projector 140 is guided through the components 146, 150, 130 and then represented to the viewer from the glass 130.

Figure 2:
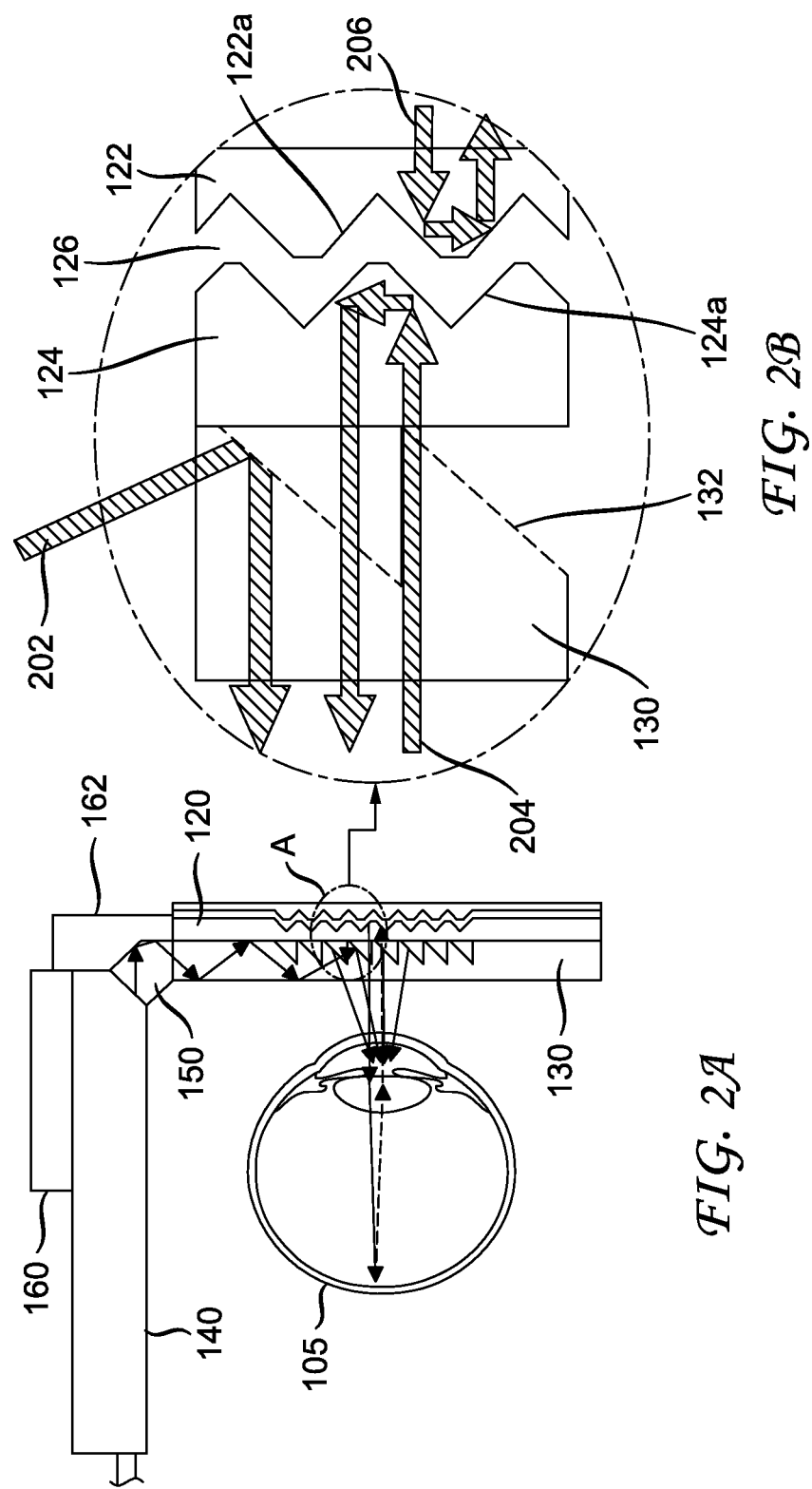
FIG. 2(a) illustrates the optical see-through glass display device as shown in FIG. 1 which is operated in "retro-reflection ON mode"
FIG. 2(b) shows an enlarged portion A in FIG. 2(a)

The device 100 may be operated in two different operational modes of "retro-reflection ON mode" and "retro-reflection OFF mode". These two operational modes will be described with reference to FIGS. 2 and 3.

FIG. 2(a) illustrates the optical see-through glass display device as shown in FIG. 1 which is operated in "retro-reflection ON mode" and FIG. 2(b) shows an enlarged portion A in FIG. 2(a). In the "retro-reflection ON mode", the liquid is not supplied to the gap 126 in the front side glass plate 120, in other words, the liquid is removed from the gap 126. Therefore, reflective surfaces 122a and 124a on both glass plates 122 and 124 will be enabled to reflect incoming lights, respectively. An ambient scene light 206 coming from ahead of the front side glass plate 122 is reflected back to the ambient scene by the reflective surface 122a, whereas light 204 coming from behind the rear side glass plate 124 is retro-reflected back to the same direction of the incoming light by the reflective surface 124a.

Virtual image light 202 projected by the projector 140 is propagated in the rear side glass plate 130 and redirected toward the eye 105 of the viewer by the semi-reflective mirrors 132. The light 202 reaches the retina in the eye 105, then the viewer will perceive the virtual image. On the other hand, low level of the light 202 is scattered on the retina of the eye 105 toward the rear side glass plate 130. Advantageously the eye retina has the characteristic of a light trap absorbing efficiently visible light and thus scattered light level is very low. The scattered light travels through the glass plate 130 and again retro-reflected back to the backward of the glass plate 130 as indicated with reference number 204 in FIG. 2(b). The retro-reflected light 204 comes into the eye 105 and is absorbed by the retina in the eye 105. In this process, the retina acts as a light trap to absorb such a scattered light of the virtual image light 202, which causes the pupil of the eye 105 to have a deep black aspect.

As described above, in the "retro-reflection ON mode" of the device 100, the deep black aspect will be caused to the viewer's eye 105 by the retro-reflection due to the reflective surface 124a on the glass plates 124. In addition, the ambient scene light 206 will be reflected back to the scene and will not reach the viewer's eye 105. These will enable to enhance contrast of the virtual image displayed on the glass plate unit 110.

Figure 3:
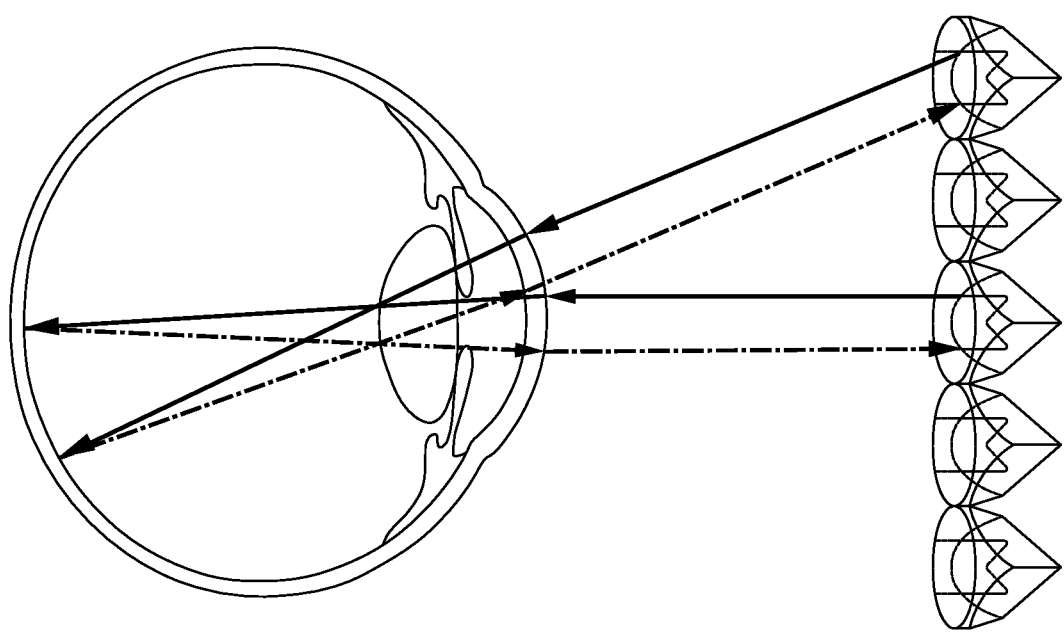
FIG. 3 is a schematic diagram showing the principle on how light scattered on a retina of viewer's eye comes back to the retina by retro-reflectors.

FIG. 3 is a schematic diagram showing the principle on how light scattered on a retina of viewer's eye comes back to the retina by retro-reflectors. In FIG. 3, the dashed lines represent lights having low light level scattered on the retina towards the outside of the eye and the plain lines represent the lights retro-reflected back to the retina by retro-reflectors.

Figure 4:
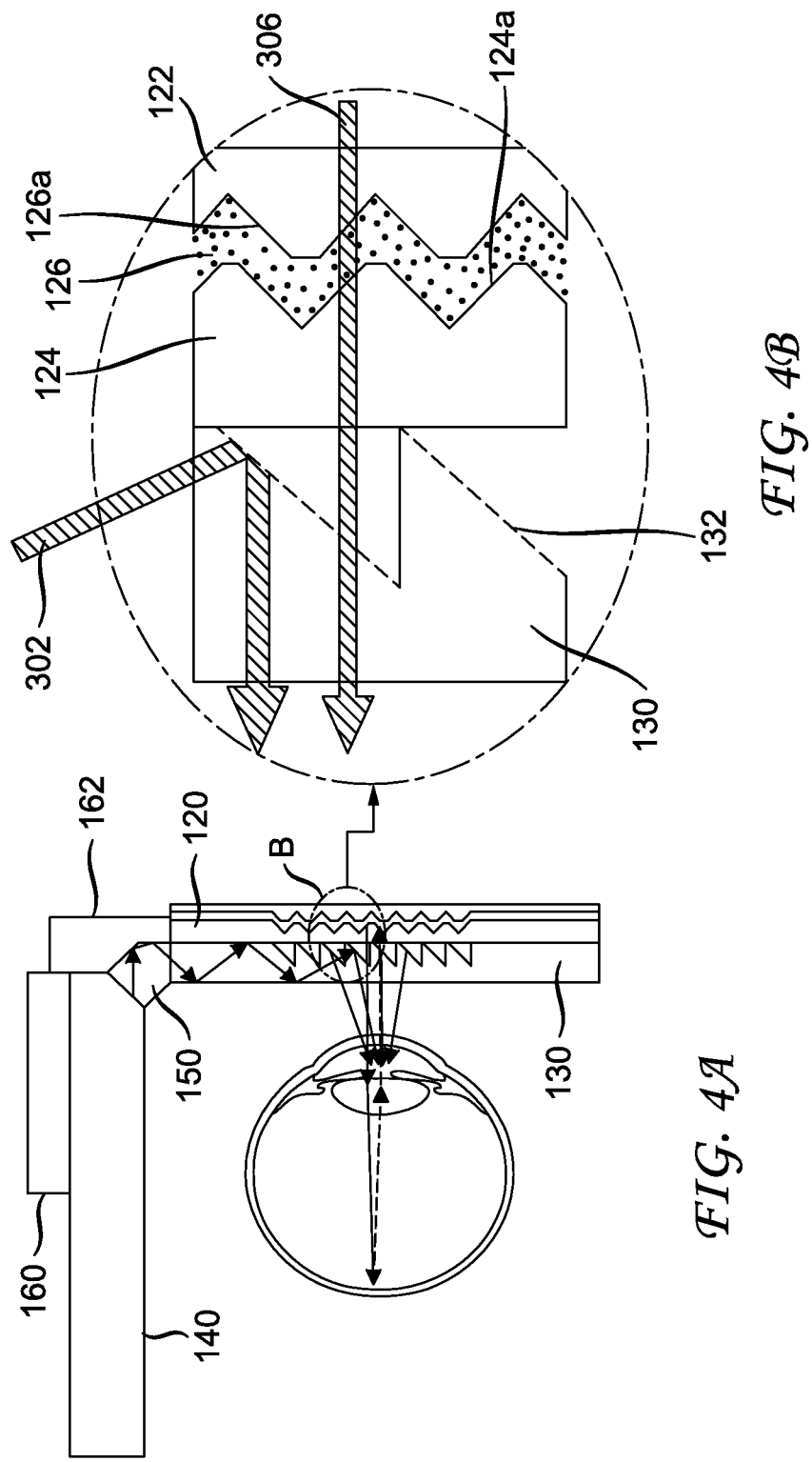
FIG. 4(a) illustrates the optical see-through glass display device as shown in FIG. 1 which is operated in "retro-reflection OFF mode"
FIG. 4(b) shows an enlarged portion B in FIG. 4(a)

FIG. 4(a) illustrates the optical see-through glass display device as shown in FIG. 1 which is operated in "retro-reflection OFF mode" and FIG. 4(b) shows an enlarged portion B in FIG. 4(a). In the "retro-reflection OFF mode", the liquid is supplied to the gap 126 in the front side glass plate 120 by the liquid supplier/remover 160, thus the gap 126 is filled with the liquid. The liquid has a refractive index which disables the total internal reflection (TIR) on the reflective surfaces 122a and 124a on both glass plates 122 and 124. Therefore, in an area of the front side glass plate 122 where the gap 126 is filled with the liquid, the ambient scene light 306 will pass through the front side glass plate 120 and also the rear side glass plate 130. The virtual image light 302 projected by the projector 140 will be propagated in the rear side glass plate 130 and redirected toward the eye 105 of the viewer by the semi-reflective mirrors 132.

In the "retro-reflection OFF mode" of the device 100, the viewer will perceive the virtual image overlaid on the ambient scene image on the glass plate 110 in the area where the gap 126 is filled with the liquid, therefore contrast of the virtual image displayed on the glass plate unit 110 would be moderated compared to that in the "retro-reflection ON mode".

It should be noted that the gap 126 may be segmented into a plural of gaps arranged in a matrix array arrangement. In this configuration, the liquid supplier/remover 160 may be connected to respective gaps 126 and configured to individually supply or remove the liquid to/from each gap 126 in the glass plate 120 by controlling a liquid flow to each gap 126. Such a liquid flow control can be realized using a technique shown in "Fluidic Optics", George M. Whitesides and Sindy K. Y. Tang, Department of Chemistry and Chemical Biology, Harvard University, Optofluidics, edited by Demetri Psaltis, Yeshaiahu Fainman, Proc. of SPIE Vol. 6329, 63290A, (2006), for example.

According to the above described configuration, the virtual image can be superimposed on the ambient scene image on the glass plate unit 110 with the enhanced contrast of the virtual image, by not supplying the liquid to the gaps 126 in an area on which the virtual image is to be displayed, but supplying the liquid to the gaps 126 in an area other than the area on which the virtual image is to be displayed. It should be noted that the projector 140 and the liquid supplier/remover 160 may be connected with any wired or wireless connection for communicating each other and for controlling the liquid supplier/remover 160 so that the controller in the liquid supplier/remover 160 can be controlled to selectively supply the liquid to the gaps 126 in the area on which the virtual image is not to be displayed or is to be displayed with less contrast.

Figure 5:
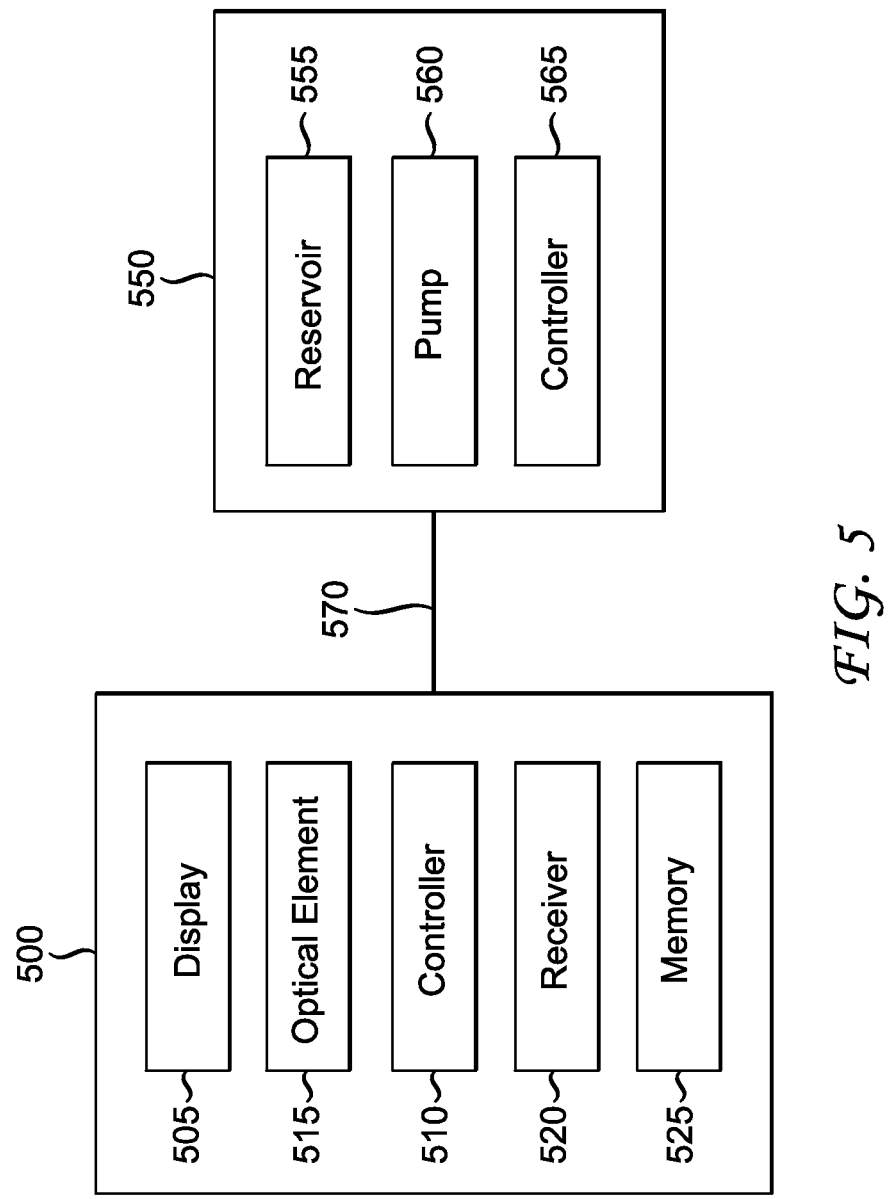
FIG. 5 is a block diagram of components of the see-through glass type display device according to an embodiment of the present invention.

FIG. 5 is a block diagram of components of the see-through glass type display device according to an embodiment of the present invention. As shown in FIG. 5, the components of the device comprise image projector 500 and liquid supplier/remover 550 connected each other via wired or wireless connection 570. The image projector 500 comprises display 505 for projecting the virtual image, controller 510 for controlling the display 505, optical element 515 for guiding light from the display 505 to the optical light guide element 150 (FIG. 1), receiver 520 and memory 525 to receive and store images or videos to be projected as the virtual image, as described hereinabove with reference to FIG. 1. Also, as shown in FIG. 5, the liquid supplier/remover 550 comprises reservoir 555 to contain the liquid, pump 560 for pumping the liquid into and out of the gap(s) 126 (FIG. 1) and controller 565 to control the pump 560 as described hereinabove with reference to FIG. 1.

Alternatively, "elements" of solid or liquid material having a variable or bistable refraction index to be driven electronically and "transparent electrodes" for individually driving the elements may be arranged in matrix forms, respectively so that refraction index for each element can be individually switched between two modes; one is a high refraction index state having about the same refraction index as that of the glasses 122 and 124 for the "retro-reflection OFF mode" and the other is a low refraction index state having lower refraction index than that of the glasses 122 and 124 for the "retro-reflection ON mode". In this configuration, ITO (Indium Tin Oxide) may be used for the transparent electrodes and a controller for electrically driving the transparent electrodes are used instead of the liquid supplier/remover, for example. The elements can be driven globally or locally to switch their refraction index between the two states so that the virtual image can be superimposed on the ambient scene image on the glass plate unit 110 with the enhanced contrast of the virtual image in the "retro-reflection ON mode".

Figure 6:
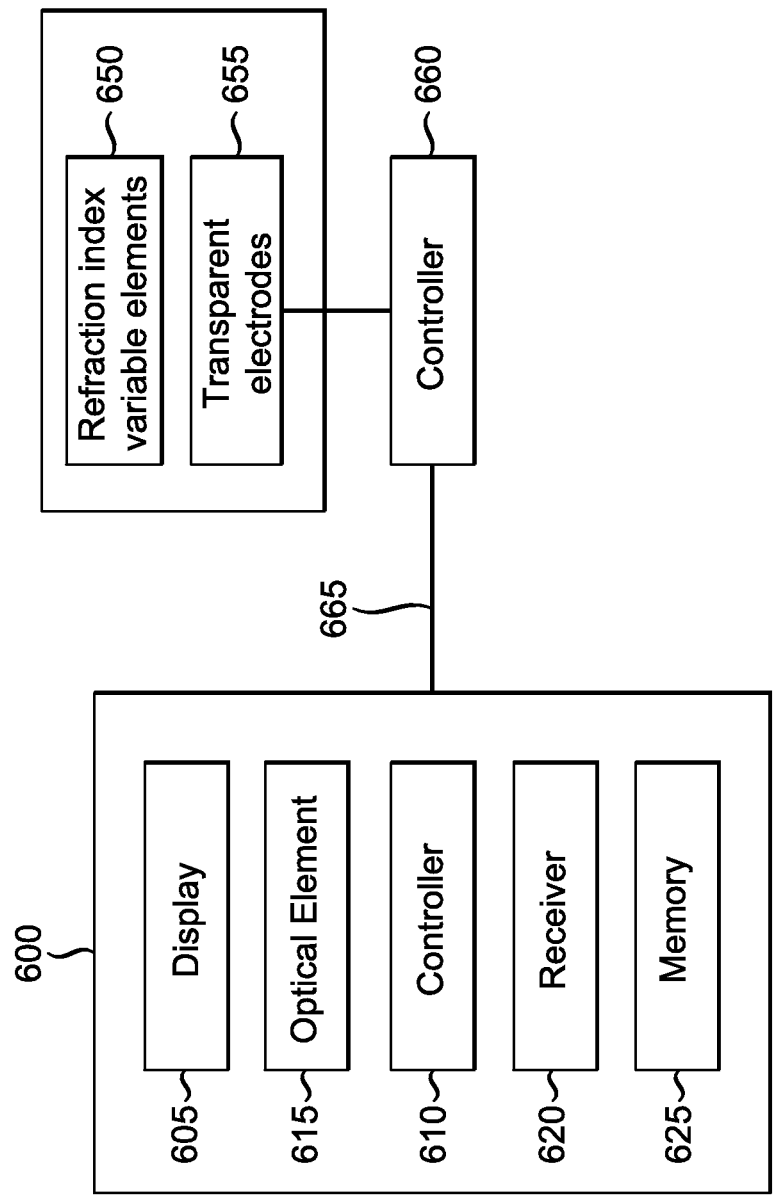
FIG. 6 is a block diagram of components of the see-through glass type display device according to an alternative embodiment of the present invention.

FIG. 6 is a block diagram of components of the see-through glass type display device according to an alternative embodiment of the present invention. As shown in FIG. 6, the components of the device comprise projector 600 having display 605, controller 610, optical element 615, receiver 620 and memory 625, which are the same elements as that of the projector 500 shown in FIG. 5 thus detailed explanations on these elements are omitted. The components of the device further comprise elements 650 of solid or liquid material having a variable or bistable refraction index to be driven electronically and transparent electrodes 655 for individually driving the elements 650 arranged in matrix forms, respectively on or embedded in the front side glass plate 120 (FIG. 1). Also, the components of the device further comprise controller 660 for electrically driving the transparent electrodes 655, which controller 660 is connected to the projector 600 with wired or wireless connection 665.

In another alternative embodiment with respect to the embodiment as shown in FIG. 1, the plate 122 may be configured to move back and forth with regard to the plate 124 between two positions; the first position in which reflective surfaces 122a and 124a are apart from each other and the second position in which the reflective surfaces contact each other. Reflection on the reflective surfaces 122a and 124a is enabled in the first position in which the reflection surfaces are apart from each other, whereas it is disabled in the second position in which the reflective surfaces touch each other to cancel the TIR effect on the both reflective surfaces. The liquid to be supplied to the gap between reflective surfaces 122a and 124a can be omitted in this embodiment.

When the reflective surfaces 122a and 124a contacting each other start to separate, the reflective surfaces 122a and 124a may not be easily pulled apart due to molecular adherence caused between the surfaces. In order to avoid such an adherence, for example, microstructures of less than 1 µm may be inserted between the surfaces 122a and 124a to create a gap preventing the adherence but keeping the possibility of TIR via evanescent waves. Reflection on the reflective surfaces 122a and 124a can be disabled by pressing the plate 122 to the plate 124 so that the surfaces 122a and 124a can touch each other to the extent that the TIR on the surfaces is canceled.

As described above, in FIG. 1, only the half components of the device 100 for the left eye of a viewer are illustrated for the simplicity of the illustration. However, it should be noted that the device 100 may comprise the same components for the right eye of a viewer as illustrated in FIG. 1 in symmetrical manner, which will provide the virtual image to both eyes of the viewer. Alternatively, the device 100 may comprise only a single, simple glass plate and a temple connected to the glass plate, or only an empty frame without a glass plate and a temple connected to the frame, for the right eye of a viewer, which will provide the virtual image to only one eye of the viewer but it would be acceptable to a certain purpose of use.

Further, in one embodiment of the invention, the glass plate unit 110 may comprise, instead of the semi-reflective mirrors 132, reflective mirrors that are positioned in such way that a gap between at least two of the mirrors exists. In another embodiment of the invention, the semi-reflective mirrors 132 may be also spaced out each other in such way that a gap between at least two of the mirrors exists. Such a gap enables external light to go through it.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention.

The invention claimed is:

1. An optical see-through glass display device, comprising:
    an image projector projecting a virtual image;
    a first optical element configured to guide light of the virtual image;
    a second optical element positioned between the first optical element and an ambient scene, having a first reflection surface for reflecting back light coming through a front surface of the second optical element and a second reflection surface for retro-reflecting light coming through a rear surface of the second optical element;
    at least one gap formed between the first reflection surface and the second reflection surface of the second optical element; and
    a liquid supplier/remover which supplies liquid to fill the gap and removes the liquid from the gap, the liquid having a refraction index capable of disabling the reflection on the first and second reflection surfaces of the second optical element,
    wherein the second optical element is switchable between a first state in which the reflection on the first and second reflection surfaces is enabled and a second state in which the reflection on the first and second reflection surfaces is disabled.

2. The display device according to claim 1, wherein the gap is segmented into a plurality of gaps arranged in a matrix form, and wherein the liquid supplier/remover supplying the liquid to fill each gap and removing the liquid from each gap, individually.

3. The display device according to claim 2, wherein the liquid supplier/remover does not supply the liquid to gaps which overlap an area of the first optical element where the virtual image is presented and the liquid supplier/remover supplies the liquid to gaps which do not overlap the area.

4. The display device according to claim 1, wherein the liquid supplier/remover comprising a reservoir for containing the liquid, a pump for pumping the liquid into and out of the gap and a controller to control the pump and liquid flow to the gap.

5. An optical see-through glass display device comprising:
    an image projector projecting a virtual image;
    a first optical element configured to guide light of the virtual image;
    a second optical element positioned between the first optical element and an ambient scene, having a first reflection surface for reflecting back light coming through a front surface of the second optical element and a second reflection surface for retro-reflecting light coming through a rear surface of the second optical element;
    refraction index variable elements arranged in a matrix form between the first reflection surface and the second reflection surface of the second optical element;
    electrodes formed on the second optical element for driving the elements individually; and
    a controller for controlling the electrodes to drive the refraction index variable elements individually so that refraction index for each element be individually switched between a low refraction index state which enables the reflection on the first and second reflection surfaces and a high refraction index state which disables the reflection on the first and second reflection surfaces, wherein the second optical element is switchable between a first state in which the reflection on the first and second reflection surfaces is enabled and a second state in which the reflection on the first and second reflection surfaces is disabled.

6. The display device according to claim 5, wherein the refraction index variable elements, which overlaps an area of the first optical element where the virtual image is presented, are switched to the low refraction index state and the refraction index variable elements which don't overlap the area are switched to the high refraction index state.

7. An optical element, comprising
    a first reflection surface for reflecting back light coming through the front surface of the optical element,
    a second reflection surface for retro-reflecting light coming through the rear surface of the optical element,
    at least one gap formed between the first reflection surface and the second reflection surface of the optical element,
    wherein liquid having a refraction index capable of disabling the reflection on the first and second reflection surfaces of the optical element may be supplied to fill the gap and removed from the gap and the optical element is switchable between a first state in which the reflection on the first and second reflection surfaces is enabled and a second state in which the reflection on the first and second reflection surfaces is disabled.

8. The optical element according to claim 7, wherein the gap is segmented into a plurality of gaps arranged in a matrix form, the liquid may be supplied to fill each gap and removed from each gap, individually.

9. An optical element comprising:
    a first reflection surface for reflecting back light coming through the front surface of the optical element;
    a second reflection surface for retro-reflecting light coming through the rear surface of the optical element;
    refraction index variable elements arranged in a matrix form between the first reflection surface and the second reflection surface of the optical element; and
    electrodes formed on the optical element for driving the elements individually,
    wherein the refraction index variable elements are individually driven by the electrodes so that refraction index for each element be individually switched between a low refraction index state which enables the reflection on the first and second reflection surfaces and a high refraction index state which disables the reflection on the first and second reflection surfaces and the optical element is switchable between a first state in which the reflection on the first and second reflection surfaces is enabled and a second state in which the reflection on the first and second reflection surfaces is disabled.

\* \* \* \* \*